A. W. LUBENOW.
FEED MECHANISM FOR SCREW MACHINES.
APPLICATION FILED NOV. 30, 1917.

1,288,072.  Patented Dec. 17, 1918.

Inventor
Arthur W. Lubenow
By Owen & Wheeler
Attorneys.

UNITED STATES PATENT OFFICE.

ARTHUR W. LUBENOW, OF MILWAUKEE, WISCONSIN.

FEED MECHANISM FOR SCREW-MACHINES.

1,288,072.   Specification of Letters Patent.   Patented Dec. 17, 1918.

Application filed November 30, 1917.   Serial No. 204,607.

*To all whom it may concern:*

Be it known that I, ARTHUR W. LUBENOW, a citizen of the United States, residing at Milwaukee, county of Milwaukee, and State of Wisconsin, have invented new and useful Improvements in Feed Mechanism for Screw-Machines, of which the following is a specification.

My invention relates to improvements in screw machines, and it pertains more especially, among other things, to the construction of the tubular clamping sleeve by which a rod or other material is moved forward a short distance at a time corresponding to the length of screw to be formed, perparatory to being rigidly clamped by the clamping jaws of the lathe used for such purpose. Heretofore the tubular clamping sleeve has been formed in a single piece, and the two opposing sides have been connected together at one end by a continuous piece of metal, whereby the opposite ends of said sleeve were caused to spring toward each other and against the rod or other material that is formed into screws, whereby the necessary friction is produced for moving such rod or other material forward from time to time as the latter is formed into screws.

By my improvement my clamping sleeve is formed in a plurality of separate pieces, and such separate pieces are held together and moved inwardly toward each other and against the rod or other material to be formed into screws by a plurality of separate clamping springs or resilient rings, two or more of such springs being preferably used whereby the two separate members of the clamping sleeve are forced toward each other and against the rod or other material which is formed into screws with uniform pressure throughout the entire length of such clamping sleeve, and the liability of such clamping sleeve becoming broken is reduced to the minimum.

It will be understood that when the rod or other material to be formed into screws is moved forward by my device it is clamped by the jaws of the ordinary lathe, whereby such rod or other material is revolved in the ordinary way as it is being acted upon by my screw forming mechanism.

My invention is further explained by reference to the accompanying drawing, in which—

Figure 1:
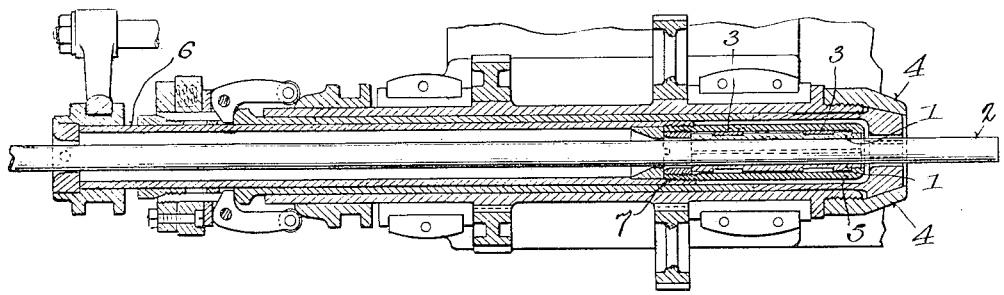
Figure 1 is a longitudinal section of a lathe provided with my improved device, only a portion of the lathe being shown.
Figure 2:
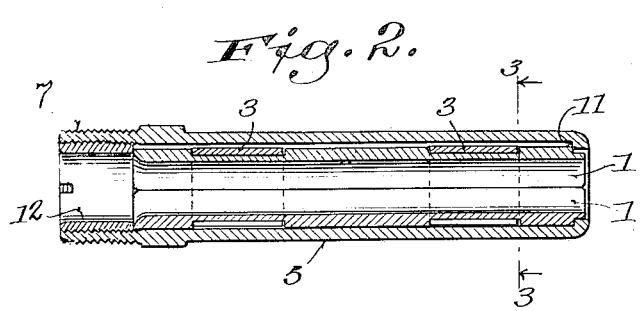
Fig. 2 is an enlarged longitudinal section of my device removed from the lathe, drawn on line 2—2 of Fig. 3.
Figure 3:
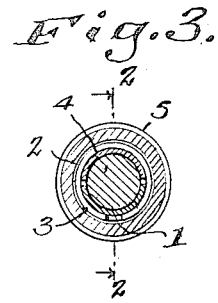
Fig. 3 is a transverse section, drawn on line 3—3 of Fig. 2.
Figure 5:
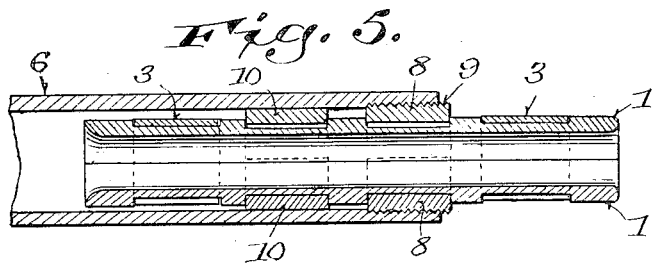
Fig. 5 is a modified form of my improved clamping device.
Figure 4:
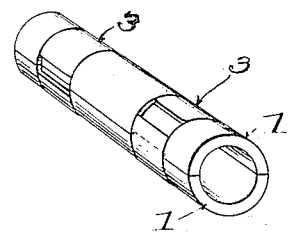
Fig. 4 is a modified form of my device in perspective, with the exterior sleeve removed.

Like parts are identified by the same reference numerals throughout the several views. My clamping sleeve comprises the two separate members 1, 1, which members are held in contact and caused to bear upon the exterior walls of the rod 2 by the annular springs 3, 3, whereby said rod 2 is moved forwardly by the friction of such parts, when it is rigidly clamped by the jaws 4, 4 of the lathe in the ordinary manner. In the form shown in Figs. 1, 2 and 3 I have shown my clamping sleeve inclosed in an additional sleeve 5, but such sleeve 5 may in some instances be dispensed with, as shown in Fig. 5, invention herein being predicated more especially upon forming the clamping sleeve in a plurality of separate parts 1, 1, and holding them in place by a plurality of annular clamping spring 3, 3, as shown, and I make no claim herein to the other parts of a lathe shown in Fig. 1.

6 is a feed sleeve. In the form shown in Figs. 1, 2 and 3 the sleeve 5 is connected with the feed sleeve by the screw thread 7. When, however, the sleeve 5 is dispensed with the tubular clamping sleeve formed of the parts 1, 1 is connected with the feed sleeve 6 by the threaded collar 9 and the collar 10. The collar 10, however, is not threaded but simply serves to support the clamping sleeve formed of the members 1, 1. In the form shown in Fig. 2 the clamping sleeve formed of the members 1, 1 bears at its front end against the shoulder 11, and at its rear end against the collar 12, whereby said clamping sleeve is adapted to be moved forwardly from time to time, as stated.

Having thus described my invention, what I claim as new, and desire to secure by Letters Patent, is:—

1. In a device of the described class, a clamping sleeve comprising a plurality of separate members, in combination with a plurality of clamping springs, and a longer tubular sleeve adapted to surround and inclose said clamping springs.

2. In a device of the described class, a clamping sleeve comprising two separate semi-tubular members, in combination with a plurality of clamping springs, said clamping springs being adapted to surround said semi-tubular members and hold the latter in contact, and to move them toward each other and against the rod or other material which is formed into screws, adapted to firmly grip the rod or other material to be formed into screws and cause the latter to revolve with said lathe.

3. In a device of the described class, a clamping sleeve comprising a plurality of separate semi-tubular members, in combination with a plurality of clamping springs, said clamping springs being adapted to surround said semi-tubular members and hold the latter in contact, and to move them toward each other and against the rod or other material which is formed into screws.

In testimony whereof I affix my signature in the presence of two witnesses.

ARTHUR W. LUBENOW.

Witnesses:
JAS. B. ERWIN,
ALICE J. MCKERIHAN.